(12) United States Patent
Tong et al.

(10) Patent No.: US 9,812,008 B2
(45) Date of Patent: Nov. 7, 2017

(54) VEHICLE DETECTION AND TRACKING BASED ON WHEELS USING RADAR AND VISION

(71) Applicant: GM GLOBAL TECHNOLOGY OPERATIONS LLC, Detroit, MI (US)

(72) Inventors: Wei Tong, Troy, MI (US); Shuqing Zeng, Sterling Heights, MI (US); Jinsong Wang, Troy, MI (US); Wende Zhang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/047,959

(22) Filed: Feb. 19, 2016

(65) Prior Publication Data

US 2017/0243478 A1    Aug. 24, 2017

(51) Int. Cl.
   *G08G 1/04*    (2006.01)

(52) U.S. Cl.
   CPC ..................... *G08G 1/04* (2013.01)

(58) Field of Classification Search
   CPC ............ G01B 11/2755; G01B 2210/30; G01B 2210/143; G01B 2210/14; G01B 2210/146; G01B 2210/286; G01B 2210/28; B60K 35/00; G08G 1/04
   See application file for complete search history.

(56) References Cited

U.S. PATENT DOCUMENTS

2005/0090983 A1\* 4/2005 Isaji ...................... B60Q 9/008
                                                                    701/301

\* cited by examiner

*Primary Examiner* — James Yang
(74) *Attorney, Agent, or Firm* — Reising Ethington P.C.

(57) ABSTRACT

A system and method are provided for detecting remote vehicles relative to a host vehicle using wheel detection. The system and method include tracking wheel candidates based on wheel detection data received from a plurality of object detection devices, comparing select parameters relating to the wheel detection data for each of the tracked wheel candidates, and identifying a remote vehicle by determining if a threshold correlation exists between any of the tracked wheel candidates based on the comparison of select parameters.

15 Claims, 6 Drawing Sheets

VEHICLE DETECTION AND TRACKING BASED ON WHEELS USING RADAR AND VISION

TECHNICAL FIELD

The present invention relates generally to object detection and tracking systems, and more particularly, to a system and method for detecting and tracking a remote vehicle based on multiple sensor wheel detection.

BACKGROUND

Many modern vehicles are equipped with advanced safety and driver-assist systems that require robust and precise object detection and tracking systems to control responsive host vehicle maneuvers. These systems utilize periodic or continuous detection of objects and control algorithms to estimate various object parameters, such as the relative object range, range rate (i.e., closing or opening velocity of object), direction of travel, object position, and size of the object. The object detection systems may use any of a number of detection technologies, such as radar, vision imaging, laser or LiDAR, ultrasound, etc. Each of these detection systems contribute to object detection and to estimating object parameters in different ways, and with various limitations. Detection of objects and tracking in adjacent lanes as required by certain safety and driver-assist systems (e.g., lateral collision prevention systems) in particular can be challenging due to performance limitations associated with some detection systems.

For example, radar devices detect and locate objects by transmitting electromagnetic signals that reflect off objects within a sensor's field-of-view. The reflected signal returns to the radar as an echo where it is processed to determine various information such as the round-trip travel time of the transmitted/received energy. The round trip travel time is directly proportional to the range of the object from the radar. In addition to range determination, there are methods to determine azimuth (i.e. cross-range) location of detected objects. Therefore, depending upon its complexity, radars are capable of locating objects in both range and azimuth relative to the device location.

Based upon the reflected signals during a sampling of the entire sensor field-of-view, a set of detection points is accumulated. Due to the nature of "reflections" collected by a remote sensor (whether a radar, laser, ultrasonic, or other active sensor), the set of detection points is representative of only certain spots on the object or objects present in the sensor's field-of-view. These detection points are analyzed in order to determine what type of objects may be present and where such object is located. However, short-range radar devices lack the angular and spatial resolution necessary to discern object-identifying details and to distinguish between closely-located objects (i.e., no point target assumption). Performance degradation also arises in radar systems when there is little or no relative speed between the host and the object, making it difficult to estimate speed and direction.

Vision imaging is also widely used by object detection and tracking systems to identify and classify objects located proximate to the host vehicle. In general, vision systems capture images with one or more camera(s), and extract objects and features from the images using various image processing techniques. The object is then tracked between the images as the object moves within the host's field-of-view. However, the appearance of moving objects can change significantly from one captured image to another. Therefore, the same object may appear different in images captured at multiple locations. When the appearance of an object or feature changes too drastically between images, the vision system is unable to maintain tracking.

SUMMARY

According to an embodiment of the invention, there is provided a method for detecting remote vehicles relative to a host vehicle using wheel detection. The method includes tracking wheel candidates based on wheel detection data received from a plurality of object detection devices, comparing select parameters relating to the wheel detection data for each of the tracked wheel candidates, and identifying a remote vehicle by determining if a threshold correlation exists between any of the tracked wheel candidates based on the comparison of select parameters.

According to another embodiment of the invention, there is provided a method for detecting remote vehicles relative to a host vehicle using wheel detection. The method includes receiving first wheel detection data relating to a first potential wheel detected from a first object detection device, receiving second wheel detection data relating to a second potential wheel detected from a second object detection device, fusing the first and second wheel detection data to generate system level wheel candidates, determining a relationship between each pair of system level wheel candidates, comparing the relationship between each pair of system level wheel candidates to a set of criteria for a vehicle profile, and detecting a vehicle when the relationship between a pair of system level wheel candidates satisfies the set of criteria for a vehicle profile.

According to yet another embodiment of the invention, there is provided a system for detecting remote vehicles relative to a host vehicle using wheel detection. The system includes at least one vehicle control module configured to receive wheel detection data relating to potential wheels detected from a plurality of object detection devices, fuse the wheel detection data from a plurality of object detection devices to generate system level wheel candidates, determine a relationship between each pair of system level wheel candidates, compare the relationship between each pair of system level wheel candidates to a set of criteria for a vehicle profile, and detect a vehicle when the relationship between a pair of system level wheel candidates satisfies the set of criteria for a vehicle profile.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

As required, detailed embodiments are disclosed herein. However, it is understood that the disclosed embodiments are merely exemplary of various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, components, systems, materials, or methods that are well-known to those having ordinary skill in the art have not been described in detail to avoid obscuring the present disclosure. Therefore, specific structural and functional details disclosed herein are not to be interpreted as limiting, but merely as a basis for the claims and as a representative basis for teaching one skilled in the art.

The system and method described below are directed to detecting and tracking remote vehicles based on wheel detection from multiple object detection devices. In one embodiment, the system includes a radar detection device and a vision detection device, each configured to detect and identify potential wheels among detected objects in a host vehicle's field-of-view. A unified wheel tracker fuses the detection data from both the radar and vision detection devices and tracks wheel candidates based on the combined wheel detection data. The presence of a remote vehicle is determined if there is a threshold correlation between any two of the tracked wheel candidates.

Figure 1:
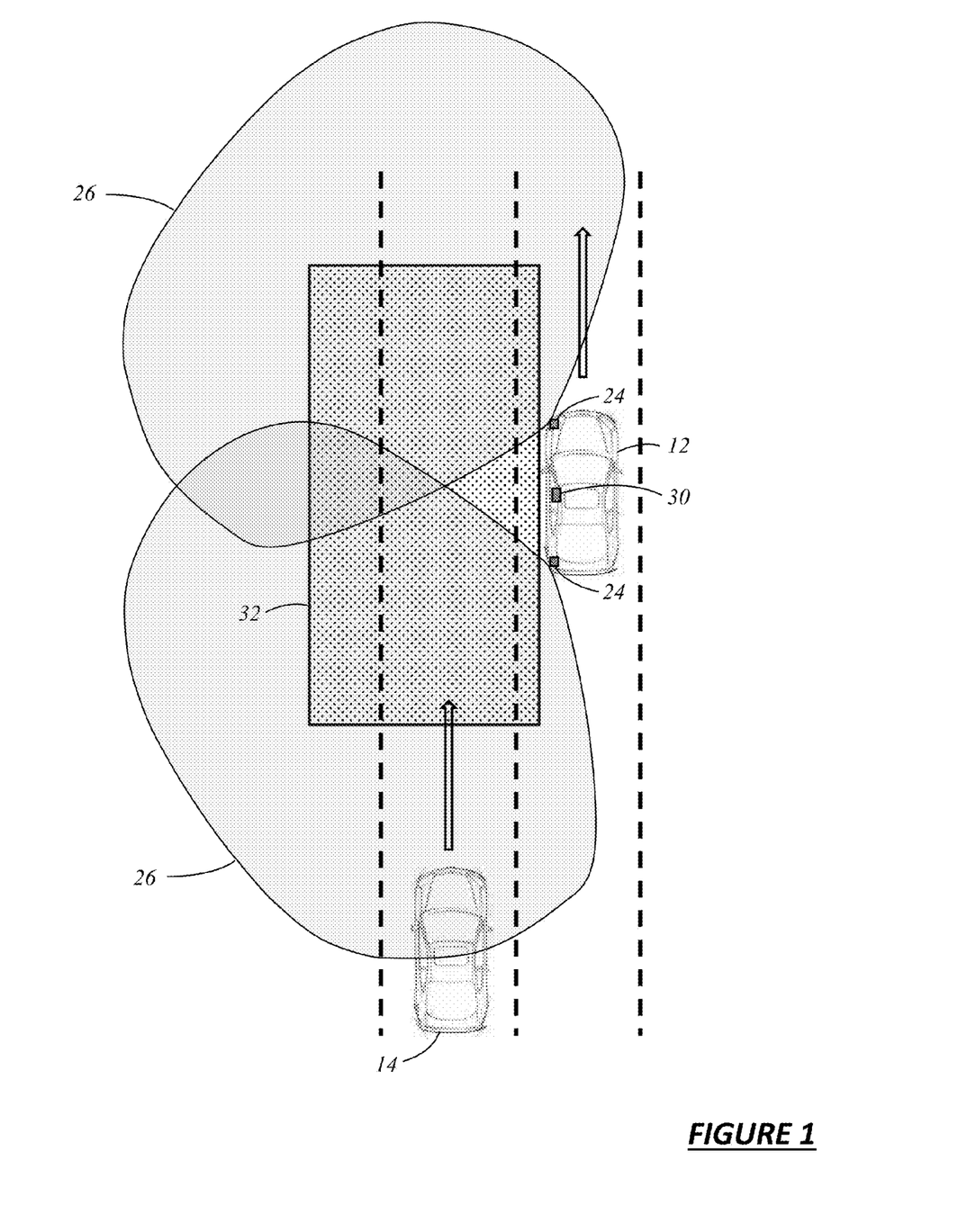
FIG. 1 illustrates an overview of an exemplary environment that includes a host vehicle and an approaching remote vehicle according to an exemplary embodiment of the present disclosure.

Although the present disclosure and exemplary embodiments are primarily described, by way of example, with respect to vision and radar detection systems, the general concepts disclosed herein can be used to fuse output from various types of sensors and object detection devices. In other words, any number of different sensors, components, devices, modules, systems, etc. may provide object detection and tracking system 10 with information or input that can be used by the present methods. It should be appreciated that object detection devices, as well as any other sensors located in and/or used by the object detection and tracking system 10 may be embodied in hardware, software, firmware, or some combination thereof. These sensors may directly sense or measure the conditions for which they are provided, or they may indirectly evaluate such conditions based on information provided by other sensors, components, devices, modules, systems, etc. Furthermore, these sensors may be directly coupled to the disclosed control module, indirectly coupled via other electronic devices, a vehicle communications bus, network, etc., or coupled according to some other arrangement known in the art. These sensors may be integrated within another vehicle component, device, module, system, etc. (e.g., sensors integrated within an engine control module (ECM), traction control system (TCS), electronic stability control (ESC) system, antilock brake system (ABS), etc.), or they may be stand-alone components (as schematically shown in FIG. 1). It is possible for any of the various sensor readings described below to be provided by some other component, device, module, system, etc. in the host vehicle instead of being directly provided by an actual sensor element. In some instances, multiple sensors might be employed to sense a single parameter (e.g., for providing signal redundancy). It should be appreciated that the foregoing scenarios represent only some of the possibilities, as any type of suitable sensor arrangement may be used by object detection and tracking system 10. That system is not limited to any particular sensor or sensor arrangement.

Figure 2:
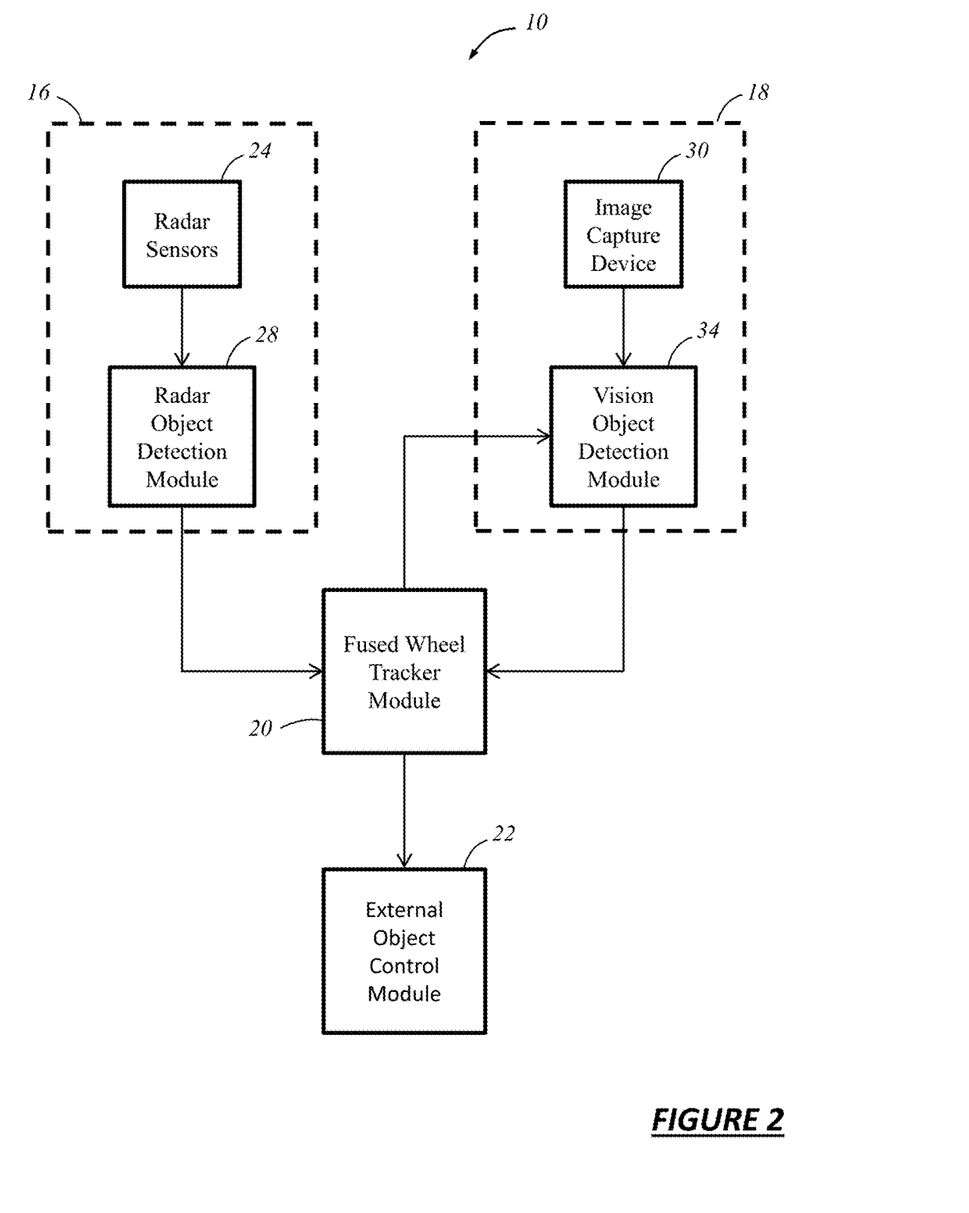
FIG. 2 illustrates a block diagram of the object detection and tracking system according to an exemplary embodiment of the present disclosure.

FIGS. 1 and 2 illustrate an object detection and tracking system 10 implemented by a host vehicle 12 according to an exemplary embodiment of the present disclosure. FIG. 1 illustrates an overview of an exemplary environment that includes the host vehicle 12 and an approaching remote vehicle 14 traveling in an adjacent lane and heading in the same general direction of travel. For ease of explanation, FIG. 1 shows only a zone of interest directed to one side of host vehicle 12 in connection with the approaching remote vehicle 14. However, one of ordinary skill in the art appreciates that typical object detection and tracking systems are implemented on all sides of the host vehicle 12 in various combinations such that objects may be detected and tracked 360 degrees around the vehicle. FIG. 2 illustrates a block diagram of the object detection and tracking system 10 according to an exemplary embodiment.

With reference to FIGS. 1 and 2, the object detection and tracking system 10 includes a plurality of object detection devices 16, 18, a wheel tracker module 20, and an a control module 22, which in one embodiment is an external object calculating module (EOCM). The plurality of object detection devices are configured to detect and track objects in the environment surrounding the host vehicle 12 and may include known object detection systems including without limitation, a light detection and ranging (LIDAR) device, a radio detection and ranging (RADAR) device, a vision device (e.g., camera, etc.), a laser diode pointer, or a combinations thereof. In the exemplary embodiment shown herein, the object detection devices in the host vehicle 12 refer to a radar detection device 16 and an imaging system 18.

The radar detection device 16 includes a plurality of radar sensors 24 positioned at various locations around the periphery of host vehicle 12. In the example shown in FIG. 1, radar sensors 24 are positioned in the front and rear left corners of the host vehicle 12, each creating a sensor field-of-view 26 that monitors a particular zone of interest. The radar sensors 24 are configured to transmit electromagnetic signals that reflect off remote objects within the radar sensor's field-of-view 26. The reflected signals return as an echo and are processed by a radar object detection module 28 that extracts information from the echo relating to the detected objects such as, for example, range, azimuth angle, and range rate data including Doppler measurements. The radar object detection module 28 may be a unitary module or may include a plurality of other modules, or sub-modules, configured to receive and process radar echo signals in accordance with the method and algorithms disclosed herein. In one embodiment, the radar object detection module 28 includes, without limitation, amplifiers, mixers, oscillators, combiners, filters, and converters. The functions performed by the radar object detection module 28 may vary, but generally include performing various filtering, amplification, conversion and digitizing functions, as well as analyzing various properties of the signal to determine characteristics of the signal such as phase, frequency, and amplitude. As understood by one of skill in the art, the techniques used to extract this information from the signals may vary, but may include without limitation, in-phase and quadrature analysis and frequency domain analysis using Fourier transform. In one embodiment, the radar object detection module 28 may also include, without limitation, components to perform pulse compression and clutter rejection (e.g., Doppler filtering) functions. As described in detail below, in accordance with the methods disclosed herein, radar object detection module 28 is configured to identify objects detected in the sensor's field-of-view 26 as potential wheels.

The imaging system 18 includes an image capture device 30 including, but not limited to, a camera, mounted at various locations around the periphery of host vehicle 12. In the example shown in FIG. 1, image capture device 30 is positioned along the left side of the host vehicle creating a field-of-view 32 that monitors a particular zone of interest, which in this example, is the left side of the host vehicle 12. The image capture device captures images of objects in the field-of-view 32 and transmits the image data to a vision-based object detection module 34. The vision-based object detection module 34 may be a unitary module or may include a plurality of other modules, or sub-modules, configured to receive and process the captured image in accordance with the method and algorithms disclosed herein. In one embodiment, processing the captured image includes extracting information relating to detected objects and may include rectification, scaling, filtering and noise reduction of the input captured image. As described in detail below, in accordance with the methods disclosed herein, the vision-based object detection module 34 is configured to identify objects detected in the system's field-of-view 32 as potential wheels.

The wheel tracker module 20 is a control module configured to receive and fuse wheel detection data from the plurality of object detection devices, which in the exemplary embodiment shown in FIGS. 1 and 2, is a radar detection device 16 and an imaging system 18. One of ordinary skill in the art appreciates that the wheel tracker module 20 may be a stand-alone module, or may be incorporated within another vehicle control module, such as, but not limited to, control module 22. In one embodiment, the wheel detection data (i.e., data relating to each detected object identified as a potential wheel) received by the wheel tracker module 20 includes a kinematic model associated with each potential wheel. The kinematic model may vary, but generally includes kinematic parameters such as position, velocity, acceleration, direction of velocity, direction of acceleration, and other motion parameters. The wheel tracker module 20 is configured to fuse or unify wheel detection data from the radar detection device 16 and the imaging system 18 to generate system level wheel candidates, which are then tracked by the wheel tracker module 20 according to known methods. The fusion of the wheel detection data from each of the object detection devices 16, 18 may include an association process wherein the wheel tracker module 20 determines whether each potential wheel detection relates to an existing wheel candidate that is already being tracked, or whether a new system level wheel candidate needs to be generated. If an association is found, the tracker for the existing system level wheel candidate is updated, which in one embodiment includes updating the associated kinematic model. One of ordinary skill in the art appreciates that the wheel detection data received from the object detection devices 16, 18 is indistinguishable from the standpoint of the wheel tracker module 20. In other words, the wheel tracker module 20 receives information relating to the detection of a potential wheel, but does not know or monitor from which device or system the information is sent.

Control module 22 may include any variety of electronic processing devices, memory devices, input/output (I/O) devices, and/or other known components, and may perform various control and/or communication related functions. Depending on the particular embodiment, control module 22 may be a stand-alone vehicle electronic module, it may be incorporated or included within another vehicle electronic module (e.g., a park assist control module, brake control module, etc.), or it may be part of a larger network or system (e.g., collision control module (CCM), a traction control system (TCS), electronic stability control (ESC) system, antilock brake system (ABS), driver assistance system, adaptive cruise control system, lane departure warning system, etc.), to name a few possibilities. Control module 22 is not limited to any one particular embodiment or arrangement.

In an exemplary embodiment, control module 22 is an external object calculating module (EOCM) that includes an electronic memory device that stores various data files, look up tables or other data structures, algorithms, etc. The memory device may also store pertinent characteristics and background information pertaining to vehicle 12, such as information relating to stopping distances, deceleration limits, temperature limits, moisture or precipitation limits, driving habits or other driver behavioral data, etc. EOCM 22 may also include an electronic processing device (e.g., a microprocessor, a microcontroller, an application specific integrated circuit (ASIC), etc.) that executes instructions for software, firmware, programs, algorithms, scripts, etc. that are stored in the memory device and may govern the processes and methods described herein. EOCM 22 may be electronically connected to other vehicle devices, modules and systems via suitable vehicle communications and can interact with them when required. These are, of course, only some of the possible arrangements, functions and capabilities of EOCM 22, as other embodiments could also be used.

In accordance with the methods disclosed herein, EOCM 22 is configured to detect a presence of a remote vehicle based on a comparison between each of the wheel candidates tracked by wheel tracker module 20. As described in further detail below, in one embodiment, the comparison between each of the wheel candidates includes comparing select characteristics of the kinematic model for each of the tracked wheel candidates. The select characteristics correspond to criteria associated with a vehicle profile, which designates threshold relationships between certain characteristics of wheels that belong to the same vehicle. The EOCM 22 determines that a vehicle has been detected, and more specifically, that at least two of the tracked wheel candidates belong to the same vehicle if at least two wheel candidates meet the criteria set forth in the vehicle profile. According to one embodiment, the criteria is based on a threshold relationship between the select kinematic characteristics of each wheel candidate.

Figure 3:
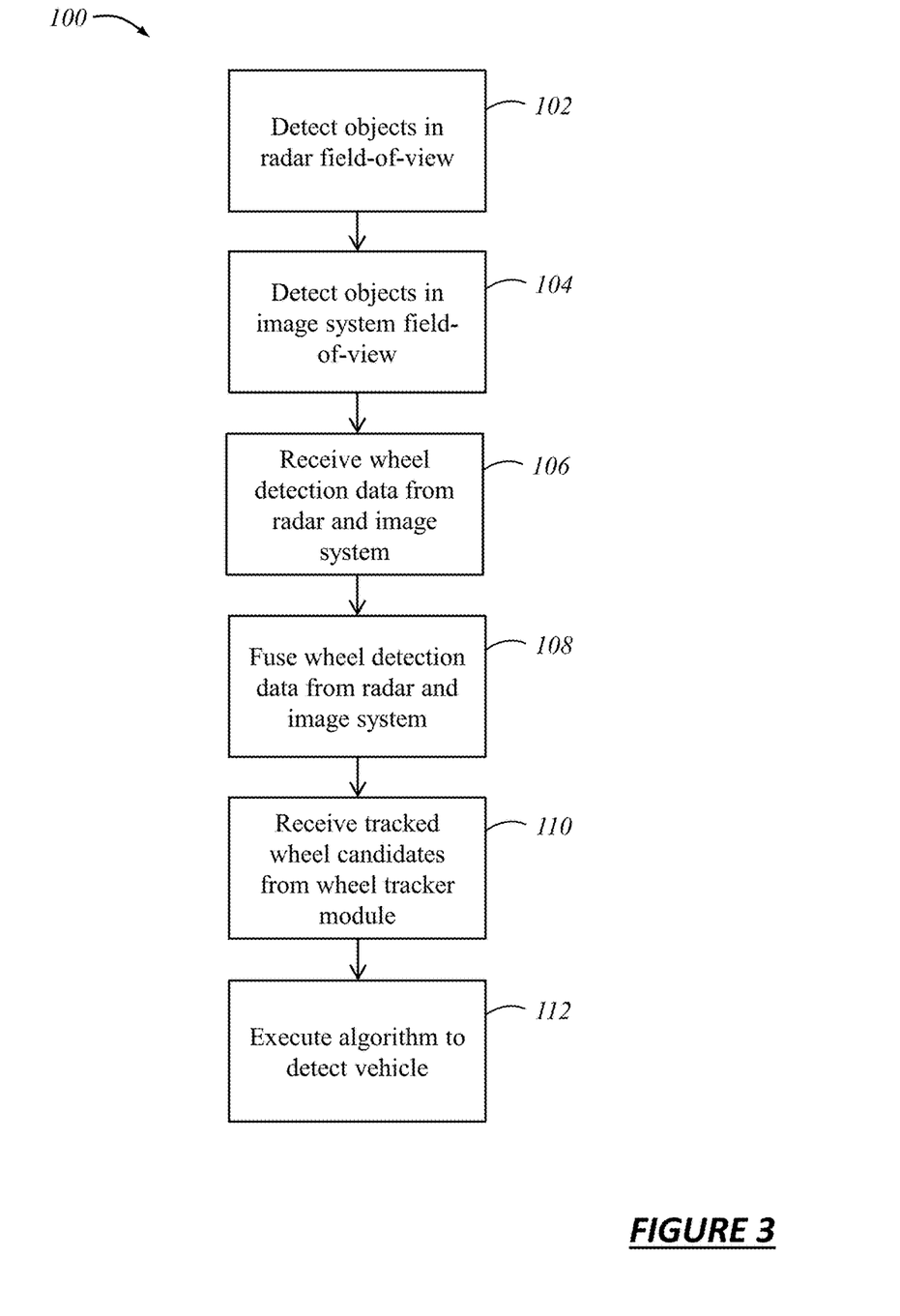
FIG. 3 illustrates a flow chart depicting an exemplary method for detecting a remote vehicle according to an exemplary embodiment of the present disclosure.

FIG. 3 illustrates a flow chart for an exemplary method 100 for detecting a remote vehicle using the object detection and tracking system 10 described above. It should be understood that the steps of the method 100 are not necessarily presented in any particular order and that performance of some or all the steps in an alternative order is possible and is contemplated.

Beginning at step 102, the radar detection device 16 detects objects in the radar's field-of-view 26 and classifies at least some of those objects as potential wheels. At step 104, the imaging system 18 detects objects in the imaging system's field-of-view 32 and classifies at least some of those objects as potential wheels. A detailed description of exemplary methods for detecting potential wheels using radar and vision imaging is provided in subsequent Figures.

At step 106, wheel detection data relating to each of the potential wheels detected in steps 102 and 104 is received by wheel tracker module 20. As set forth above, wheel detection data may include a kinematic model associated with each potential wheel, which includes, but is not limited to, kinematic parameters such as position, velocity, acceleration, direction of velocity, direction of acceleration, and other motion parameters.

At step 108, the wheel tracker module 20 fuses the wheel detection data received from the radar detection device 16 and the imaging system 18 by determining whether each of the received potential wheels is associated with an existing track (i.e., a potential wheel that is already being tracked by the tracker module 20 as a tracked wheel candidate). In one embodiment, the wheel tracker module 20 compares the wheel detection data for each potential wheel to data associated with each of the existing tracked wheel candidates. If the wheel detection data for the newly received potential wheel matches an existing track, then the existing tracked wheel candidate is updated using the newly acquired detection data. If the wheel detection data for the newly received potential wheel cannot be associated with an existing track, then a track for a new wheel candidate is initiated. In other words, the wheel tracker module 20 in step 108 fuses and tracks all potential wheel detections from both the radar and imaging detection systems 16, 18.

At step 110, EOCM 22 receives information relating to each tracked wheel candidate from the wheel tracker module 20, including wheel detection data. At step 112, EOCM 22 executes an algorithm to detect a vehicle based on the wheel candidates tracked by the fused wheel tracker module 20. The EOCM 22 determines that a vehicle has been detected, and more specifically, that at least two of the tracked wheel candidates belong to the same vehicle if at least two of the wheel candidates meet the criteria set forth in a vehicle profile. According to one embodiment, the criteria is based on a threshold relationship between the select kinematic characteristics of each wheel candidate.

More specifically, the presence of a remote vehicle 14 relative to the host vehicle 12 is based on a comparison between each of the wheel candidates tracked by wheel tracker module 20, but more particularly, between the characteristics for each tracked wheel candidate. The comparison includes comparing select parameters of the kinematic model for each of the tracked wheel candidates. The select parameters correspond to criteria associated with a vehicle profile, which designates threshold relationships between certain characteristics of wheels that belong to the same vehicle. In other words, the wheels of a vehicle have a specific relationship to one another, which can be quantified by comparing certain motion parameters. For example, two wheels of the same vehicle have common characteristics that can be expressed in terms of the location and speed of each wheel. More specifically, two wheels of the same vehicle should have a similar speed and direction, and should be positioned close enough to fall within the distance of vehicle wheelbase. If the relationship between select parameters for two wheels does not satisfy the criteria associated with a particular vehicle profile, then those two wheels are not likely from the same vehicle.

Figure 4:
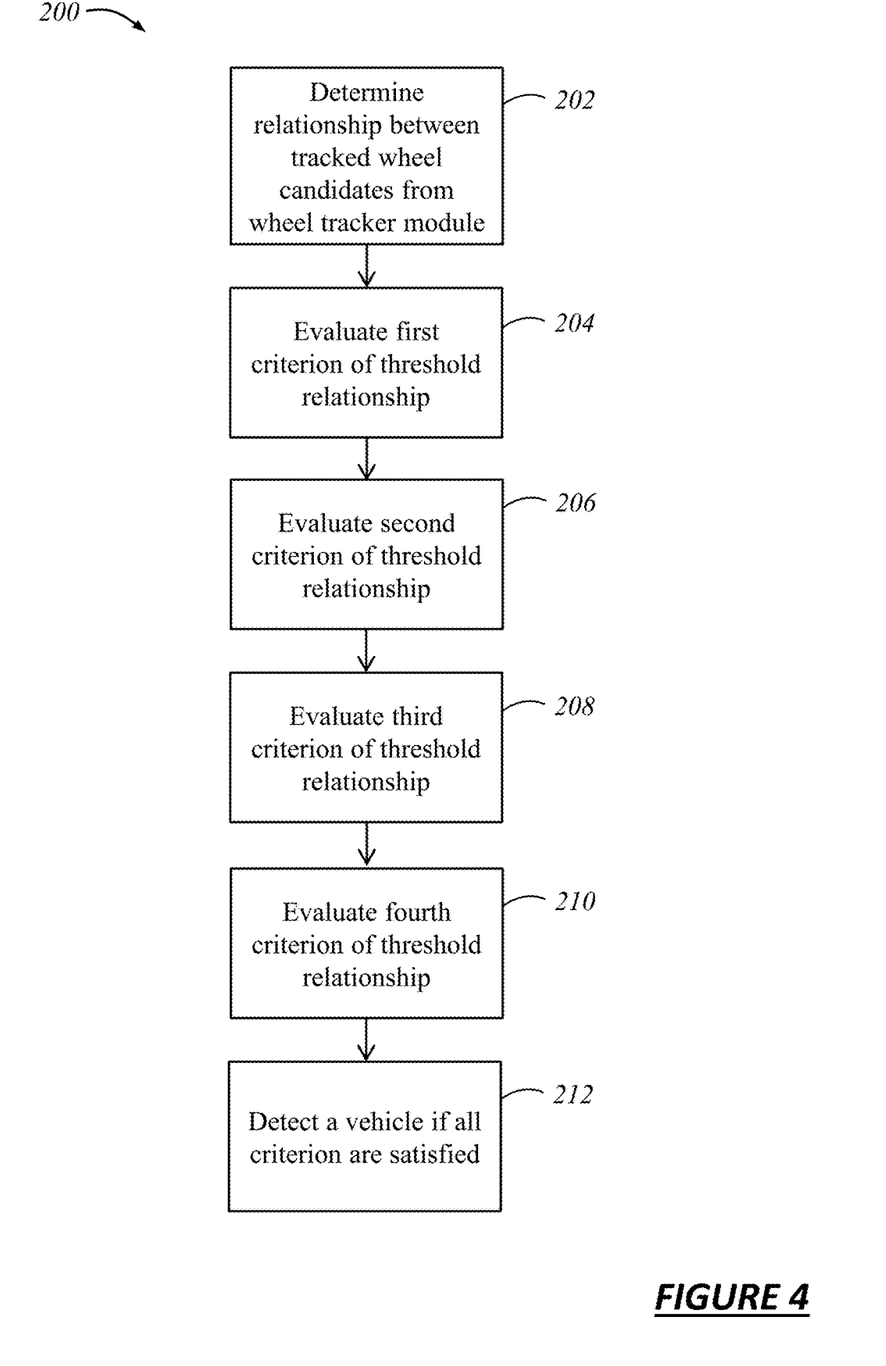
FIG. 4 illustrates a flow chart depicting another exemplary method for detecting a remote vehicle according to an exemplary embodiment of the present disclosure.

FIG. 4 illustrates a flow chart for an exemplary method 200 for detecting a vehicle as set forth in step 112 according to a specific implementation. The method 200 compares characteristics for each tracked wheel candidates to one another such that each tracked wheel candidate is compared to each of the other wheel candidates. In this way, a relationship is determined between each pair of tracked wheel candidates. The wheel detection data for each tracked wheel candidate includes location l and speed $\vec{v}$ information, wherein the location l is the (x,y,z) value of a wheel candidate in the host vehicle 12 reference coordinate system and the speed vector $\vec{v}$ includes both the direction and the magnitude of the speed of the tracked wheel candidate, which is also in the host vehicle 12 reference system.

Beginning at step 202, a relationship between each pair of tracked wheel candidates $w_i=(l_i, \vec{v}_i)$ and $w_1=(l_j, \vec{v}_j)$ is determined by evaluating various parameters associated with the kinematic model for each tracked wheel candidate $w_i$, $w_j$ against a set of criteria for a predetermined vehicle profile. In one embodiment, the set of criteria includes four criterions that define threshold relationships between select kinematic parameters. Each of the relationships associated with the criterion are compared to thresholds, which are generally small and are determined based on a particular vehicle profile.

At step 204, a first of the criterion is evaluated by determining if both of the tracked wheel candidates $w_i$, $w_j$ have a similar speed direction, and more specifically, whether a speed direction differential is less than a speed direction threshold $t_{sd}$. In one embodiment, the speed direction relationship between two tracked wheel candidates is determined by:

$$0 \le \frac{\vec{v_i}}{|\vec{v_i}|} \times \frac{\vec{v_j}}{|\vec{v_j}|} < t_{sd}$$

where x is the cross product between two speed vectors $\vec{v}_i$, $\vec{v}_j$ and $t_{sd}$ is the speed direction threshold, $|\vec{v}_i|$ is the magnitude of the speed vector $\vec{v}_i$, $|\vec{v}_j|$ is the magnitude of the speed vector $\vec{v}_j$.

At step 206, a second of the criterion is evaluated by determining if both of the tracked wheel candidates $w_i$, $w_j$ have a similar speed magnitude, and more specifically, whether a speed magnitude differential is less than a speed magnitude threshold $t_{sm}$. In one embodiment, the speed magnitude relationship between two tracked wheel candidates is determined by:

$$||\vec{v}_i|-|\vec{v}_j||<t_{sm},$$

where $|\vec{v}_i|$ is the magnitude of the speed vector $\vec{v}_i$, $|\vec{v}_j|$ is the magnitude of the speed vector $\vec{v}_j$, $t_{sm}$ is the speed magnitude threshold, and |x| is the absolute value of x.

At step 208, a third of the criterion is evaluated by determining if a potential vehicle body direction is aligned with the speed direction of either of the tracked wheel candidates $w_i$, $w_j$. In one embodiment, the alignment relationship between two tracked wheel candidates is determined by:

$$\overrightarrow{l_i-l_j} \times \vec{v}_i < t_a,$$

$$\frac{\overrightarrow{l_i-l_j}}{|\overrightarrow{l_i-l_j}|} \times \frac{\vec{v}_i}{|\vec{v}_i|} < t_a$$

where $\vec{l_i-l_j}$ is the vector from the location $l_i$ of wheel candidate $w_i$ to the location $l_j$ of wheel candidate $w_j$, $|\vec{l_i-l_j}|$ is the magnitude of the vector $\vec{l_i-l_j}$, x is the cross product between the two vectors, $\vec{v}_i$ is the speed vector, $|\vec{v}_i|$ is the magnitude of the vector $\vec{v}_i$, and $t_a$, is the alignment threshold.

At step 210, a fourth of the criterion is evaluated by determining if the distance between the tracked wheel candidates $w_i$, $w_j$ is within a threshold distance that corresponds to the length of the wheelbase of a normal vehicle as set forth by the vehicle profile. In one embodiment, the distance relationship between two tracked wheel candidates is determined by:

$$d_1 < d(w_i, w_j) < d_2,$$

where $d(w_i, w_j)$ is the distance between the wheel candidates $w_i$ and $w_j$, $d_1$ and $d_2$ are the distance thresholds that define the length of the wheelbase in the vehicle profile.

If the criterion set forth in each of steps 204-210 are satisfied (i.e., each of the relationships are true), then the pair of wheel candidates under evaluation are from the same vehicle, and therefore, a vehicle is detected at step 212. The location of the vehicle can then be estimated as being the middle of a line segment between the two wheels $w_i$, $w_j$, and the speed direction and magnitude of the vehicle can be estimated as being the average of those for wheels $w_i$ and $w_j$.

Figure 5:
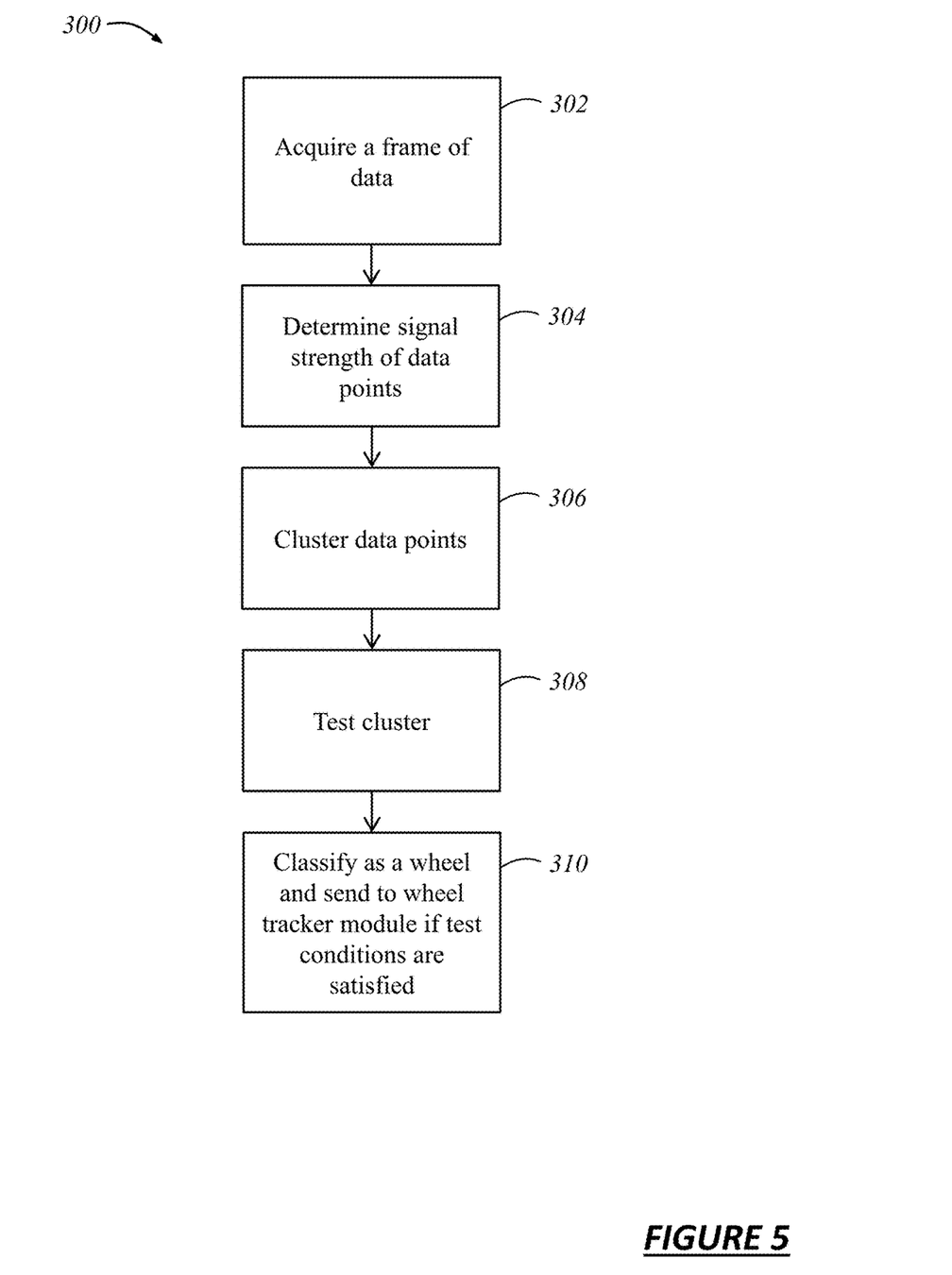
FIG. 5 illustrates a flow chart depicting an exemplary method for detecting potential wheels using a radar detection device according to an exemplary embodiment of the present disclosure.

FIG. 5 illustrates a flow chart for an exemplary method 300 for detecting potential wheels using the radar detection device 16, and more specifically, the radar object detection module 28, according to a specific embodiment. As understood by those of ordinary skill in the art, the method 300 disclosed herein is merely exemplary in that there may be other methods for detecting wheels with radar sensors that fall within the scope of the present disclosure.

The method 300 begins at step 302 by acquiring a frame of radar measurements (or points) $m_1, m_2, \ldots m_k$, for each $m_i$, from radar sensors 24. The measurements may include, without limitation, range r, angle θ, Doppler v, and signal strength s. At step 304, for each measurement $m_i$, determine if the signal strength s is within the desired range given by:

$$s_{low} \leq s \leq s_{high}$$

where $s_{low}$ is the low signal threshold and $s_{high}$ is the high signal threshold. As is known by those having ordinary skill in the art, radar echo signals from a wheel have a relatively stable signal strength range. Therefore, if the signal strength s of a particular measurement is not within the threshold range, the measurement $m_i$ is discarded as the detected object is not a wheel.

The remaining measurements that are not discarded in step 304 are clustered in step 306 based on their locations computed from the range r and angle θ measurements, according to known methods. Measurements having locations that are within a threshold distance from one another are grouped into one cluster. The threshold distance may vary depending on the specific application. At step 308, a set of conditions is tested for each cluster of radar points $C_i = (m_{i1}, m_{i2}, \ldots, m_{ij})$. In one embodiment, the set of conditions is tested by performing the following steps:

1) Determining if the standard deviation of the Doppler speeds of for these points $C_i$ is greater than or equal to a predefined threshold;
2) Sort the radar points in the cluster based on their Doppler speeds in an ascending order;
3) Compute the difference of the Doppler speeds $\delta_v^k$ between the radar point at ranking position k and k+1, where k=1, 2, ..., j−1;
4) Compute a mean $\overline{\delta_v}$, and standard deviation $\sigma_{\delta_v}$ for $\delta_v^k$; and
5) Determine if $\overline{\delta_v} > \delta_0$ and $\sigma_{\delta_v} < \sigma_1$, where $\delta_0$ and $\sigma_1$ are predefined thresholds.

If a cluster of radar points $C_i = (m_{i1}, m_{i2}, \ldots m_{ij})$ satisfies steps 1-5 above, at step 310 the cluster is recognized as a wheel, otherwise the cluster is not a wheel. If the cluster is recognized as a wheel in step 310, a potential wheel and associated wheel detection data is sent to wheel tracker module 20.

Figure 6:
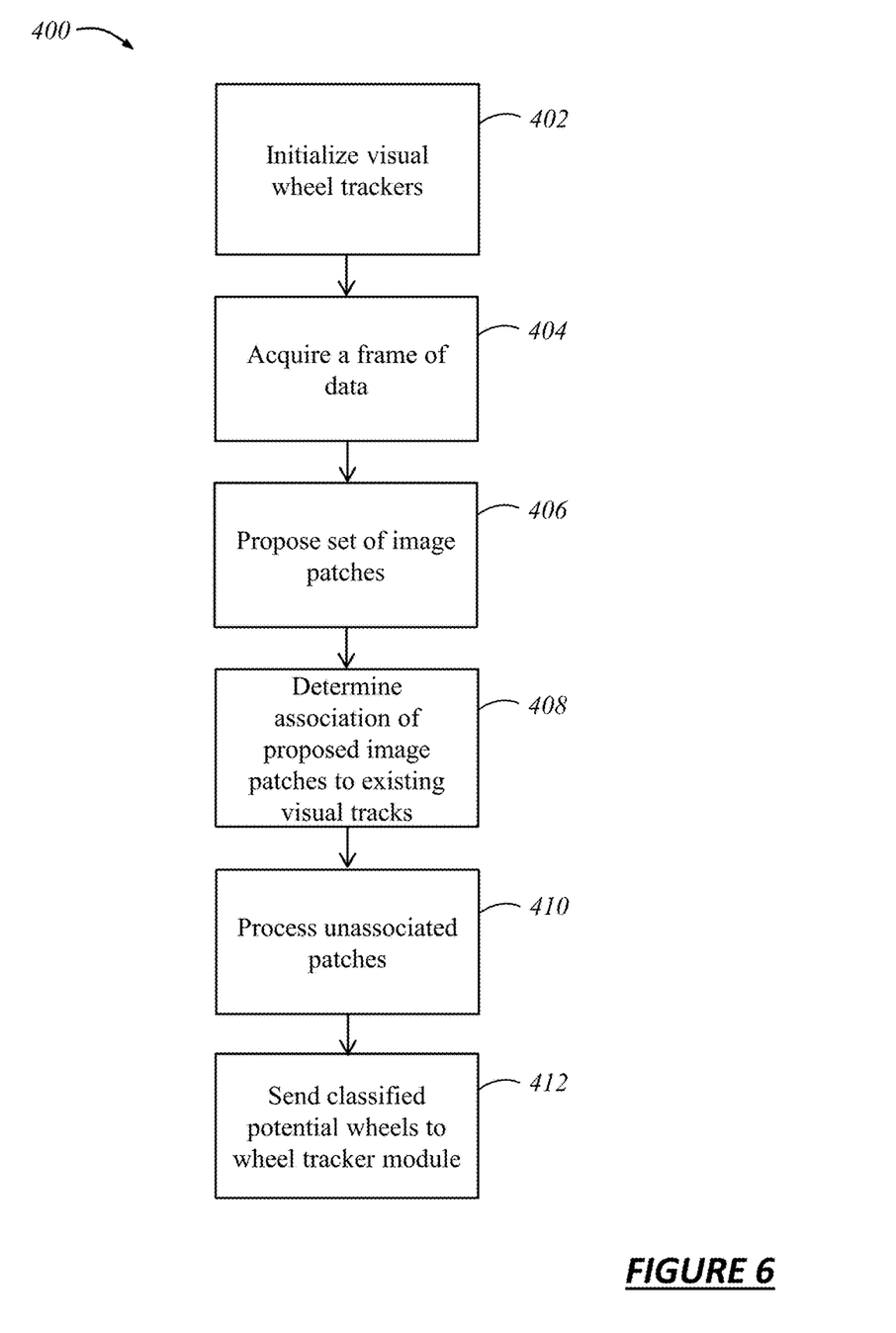
FIG. 6 illustrates a flow chart depicting an exemplary method for detecting potential wheels using an imaging system according to an exemplary embodiment of the present disclosure.

FIG. 6 illustrates a flow chart for an exemplary method 400 for detecting potential wheels using the imaging device 18, and more specifically, the vision-based object detection module 34, according to a specific embodiment. As understood by those of ordinary skill in the art, the method 400 disclosed herein is merely exemplary in that there may be other methods for detecting wheels with vision systems that fall within the scope of the present disclosure.

The method 400 begins at step 402 by initialing the visual wheel trackers. In one embodiment, the visual wheel trackers are a sub-module of the vision-based object detection module 34 and are configured to save wheel appearance models and locations of potential wheels detected by the imaging system 18. By initializing the visual wheel trackers, the wheel appearance model of each visual wheel tracker is set to a default pre-trained model, and the location of the potential wheel is set to be invalid.

At step 404, the vision-based object detection module 34 obtains a frame of data including an image frame from the image capture device 30 at time t. In one embodiment, the frame of data further includes wheel detection data associated with potential wheels detected from the radar detection device 16 at the same time. The frame of data may further include wheel detection data from wheel candidates tracked by the fused wheel tracker module 20 at time t−1. The locations of the potential wheels extraction from the wheel data from the radar detection device 16 and/or the fused wheel tracker module 20 are projected onto the image frame according to known methods.

At step 406, a set of image patches of potential wheels is proposed from the image frame. For example, proposed patches may be patches centered at the potential wheels locations suggested by the radar detection device 16 and/or the fused wheel tracker module 20 introduced in 404. In another example, the proposed patches may be generated using the standard sliding window method as known in the art.

At step 408, the proposed patches of the wheel image are compared with existing tracks from the visual wheel tracker to determine if there is association. In one embodiment, an association is determined by measuring the distance between the locations of a proposed wheel image patch to the existing tracker's location. If the distance is less than a threshold, the patch is then associated with the existing tracker. If an association is detected, the appearance model of the existing visual track is updated with the associated image patches according to known methods.

At step 410, all unassociated patches are processed according to known methods to determine if the unassociated patches are potential wheels. If the unassociated patches are classified as a wheel, a new visual wheel tracker is created, otherwise, the patches are discarded.

At step 412, each of the potential wheels and associated wheel detection data from the visual wheel tracker is sent to wheel tracker module 20.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

While the above-description includes a general context of computer-executable instructions, the present disclosure can also be implemented in combination with other program modules and/or as a combination of hardware and software. The terms "algorithm," "method," "application," or variants thereof, are used expansively herein to include routines, program modules, programs, components, data structures, algorithms, and the like. Applications can be implemented on various system configurations, including single-processor or multiprocessor systems, microprocessor-based electronics, combinations thereof, and the like.

What is claimed is:

1. A method for detecting remote vehicles relative to a host vehicle using wheel detection, the method comprising the steps of:
   tracking wheel candidates based on wheel detection data received from a plurality of object detection devices, wherein the wheel detection data includes a kinematic model for each tracked wheel candidate;
   comparing select parameters from the kinematic model for each pair of tracked wheel candidates, wherein each pair of tracked wheel candidates include a first tracked wheel candidate and a second tracked wheel candidate, and wherein the comparison of select parameters relate to a set of criteria for a vehicle profile; and
   identifying a remote vehicle by determining if a threshold correlation exists between any pair of tracked wheel candidates based on the comparison of the select parameters, wherein the threshold correlation exists by satisfying the set of criteria for the vehicle profile, and wherein the set of criteria includes a threshold relationship between a speed direction of the first and second wheel candidates, a threshold relationship between a speed magnitude of the first and second wheel candidates, a threshold relationship between an alignment of the speed direction with a body direction associated with the vehicle profile, and a threshold relationship of a distance between the first and second wheel candidates.

2. The method of claim 1, wherein the wheel detection data includes information relating to one or more detected objects identified by the plurality of object detection devices as a potential wheel.

3. The method of claim 1, further including fusing wheel detection data received from the plurality of object detection devices.

4. The method of claim 1, wherein the plurality of object detection devices includes a first object detection device and a second object detection device.

5. The method of claim 4, wherein the first object detection device is a radar detection device and the second object detection device is an imaging system.

6. The method of claim 3, wherein the wheel detection data refers to one or more detected objects identified by the plurality of object detection devices as a potential wheel, and wherein fusing the wheel detection data received from the plurality of object detection devices includes determining whether the potential wheels received by the plurality of object detection devices are associated with an existing track for a tracked wheel candidate.

7. The method of claim 2, wherein the kinematic model for each potential wheel includes parameters relating to position, velocity, acceleration, direction of velocity, and direction of acceleration for each potential wheel.

8. A method for detecting remote vehicles relative to a host vehicle using wheel detection, the method comprising the steps of:
   receiving first wheel detection data relating to a first potential wheel detected from a first object detection device;
   receiving second wheel detection data relating to a second potential wheel detected from a second object detection device;
   fusing the first and second wheel detection data to generate system level wheel candidates;
   determining a relationship between each pair of system level wheel candidates;
   comparing the relationship between each pair of system level wheel candidates to a set of criteria for a vehicle profile; and
   detecting a vehicle when the relationship between a pair of system level wheel candidates satisfies the set of criteria for a vehicle profile, wherein each pair of system level wheel candidates include a first wheel candidate and a second wheel candidate, and wherein the set of criteria includes a threshold relationship between a speed direction of the first and second wheel candidates, a threshold relationship between a speed magnitude of the first and second wheel candidates, a threshold relationship between an alignment of the speed direction with a body direction associated with the vehicle profile, and a threshold relationship of a distance between the first and second wheel candidates.

9. The method of claim 8, wherein the first object detection device is a radar detection device and the second object detection device is an imaging system.

10. The method of claim 8, wherein fusing the first and second wheel detection data includes determining whether the first and second potential wheels are associated with an existing track for a system level wheel candidate.

11. The method of claim 8, wherein determining the relationship between each pair of system level wheel candidates includes comparing select parameters relating to a kinematic model for each system level wheel candidate.

12. The method of claim 11, wherein the select parameters correspond to criteria associated with the vehicle profile that designates threshold relationships between predetermined characteristics of wheels that belong to a same vehicle.

13. A system for detecting remote vehicles relative to a host vehicle using wheel detection, the system comprising:
at least one vehicle control module configured to:
receive wheel detection data relating to potential wheels detected from a plurality of object detection devices;
fuse the wheel detection data from a plurality of object detection devices to generate system level wheel candidates;
determine a relationship between each pair of system level wheel candidates;
compare the relationship between each pair of system level wheel candidates to a set of criteria for a vehicle profile; and
detect a vehicle when the relationship between a pair of system level wheel candidates satisfies the set of criteria for a vehicle profile, wherein each pair of system level wheel candidates include a first wheel candidate and a second wheel candidate, and wherein the set of criteria includes a threshold relationship between a speed direction of the first and second wheel candidates, a threshold relationship between a speed magnitude of the first and second wheel candidates, a threshold relationship between an alignment of the speed direction with a body direction associated with the vehicle profile, and a threshold relationship of a distance between the first and second wheel candidates.

14. The system of claim 13, wherein the at least one vehicle control module includes a wheel tracker module configured to track the system level wheel candidates.

15. The system of claim 13, wherein the first object detection device is a radar detection device and the second object detection device is an imaging system.

* * * * *